US011859987B2

(12) United States Patent
Quint et al.

(10) Patent No.: US 11,859,987 B2
(45) Date of Patent: ***Jan. 2, 2024

(54) DESTINATION SELECTION INCORPORATING TIME CONSTRAINTS

(71) Applicant: Rivian IP Holdings, LLC, Irvine, CA (US)

(72) Inventors: Jason Quint, Ann Arbor, MI (US); Kok Wei Koh, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,816

(22) Filed: Nov. 22, 2022

(65) Prior Publication Data

US 2023/0089613 A1    Mar. 23, 2023

Related U.S. Application Data

(63) Continuation of application No. 17/083,359, filed on Oct. 29, 2020, now Pat. No. 11,530,928.

(51) Int. Cl.
*G01C 21/34* (2006.01)
*G01C 21/36* (2006.01)

(52) U.S. Cl.
CPC ....... *G01C 21/343* (2013.01); *G01C 21/3415* (2013.01); *G01C 21/3469* (2013.01); *G01C 21/3605* (2013.01); *G01C 21/3626* (2013.01)

(58) Field of Classification Search
CPC .............. G01C 21/3415; G01C 21/343; G01C 21/3469; G01C 21/3605; G01C 21/3626
See application file for complete search history.

(56) References Cited

U.S. PATENT DOCUMENTS

| | | | |
|---|---|---|---|
| 9,140,570 B1 * | 9/2015 | Baird | G01C 21/3682 |
| 9,838,848 B2 * | 12/2017 | Lovich | H04W 4/022 |
| 9,933,271 B2 * | 4/2018 | Magazinik | G01C 21/3438 |
| 9,983,021 B1 * | 5/2018 | Baird | G01C 21/3667 |
| 10,055,382 B2 * | 8/2018 | Min | G06F 17/00 |
| 10,228,257 B2 * | 3/2019 | Baer | G01C 21/3415 |
| 11,346,681 B2 * | 5/2022 | Malewicz | G06F 16/29 |
| 11,361,361 B2 * | 6/2022 | Malewicz | G06Q 50/30 |

(Continued)

*Primary Examiner* — Babar Sarwar
(74) *Attorney, Agent, or Firm* — Clements Bernard Walker; Christopher L. Bernard

(57) ABSTRACT

Disclosed embodiments include systems, vehicles, and methods for receiving inputs indicative of a destination and a potential intermediate destination and determining a time potentially available at the intermediate destination. In an illustrative embodiment, a system includes a computing device having computer-readable media storing computer-executable instructions configured to cause the computing device to receive a first input indicative of a destination. A second input is received that is indicative of a desired arrival time at the destination. A third input is received that is indicative of an intermediate destination to be visited before traveling to the destination. A first travel time to the intermediate destination, a second travel time to the destination, and a time available at the intermediate destination are determined. The time available at the intermediate destination is communicated to a user.

20 Claims, 15 Drawing Sheets

(56) References Cited

U.S. PATENT DOCUMENTS

| | | | |
|---|---|---|---|
| 2007/0288155 A1* | 12/2007 | Kaneda | G08G 1/096838 |
| | | | 701/465 |
| 2018/0144369 A1* | 5/2018 | Pouliot | B60W 10/08 |
| 2018/0216948 A1* | 8/2018 | Ba | G01C 21/343 |
| 2020/0370906 A1* | 11/2020 | Hayakawa | G09B 29/10 |

* cited by examiner

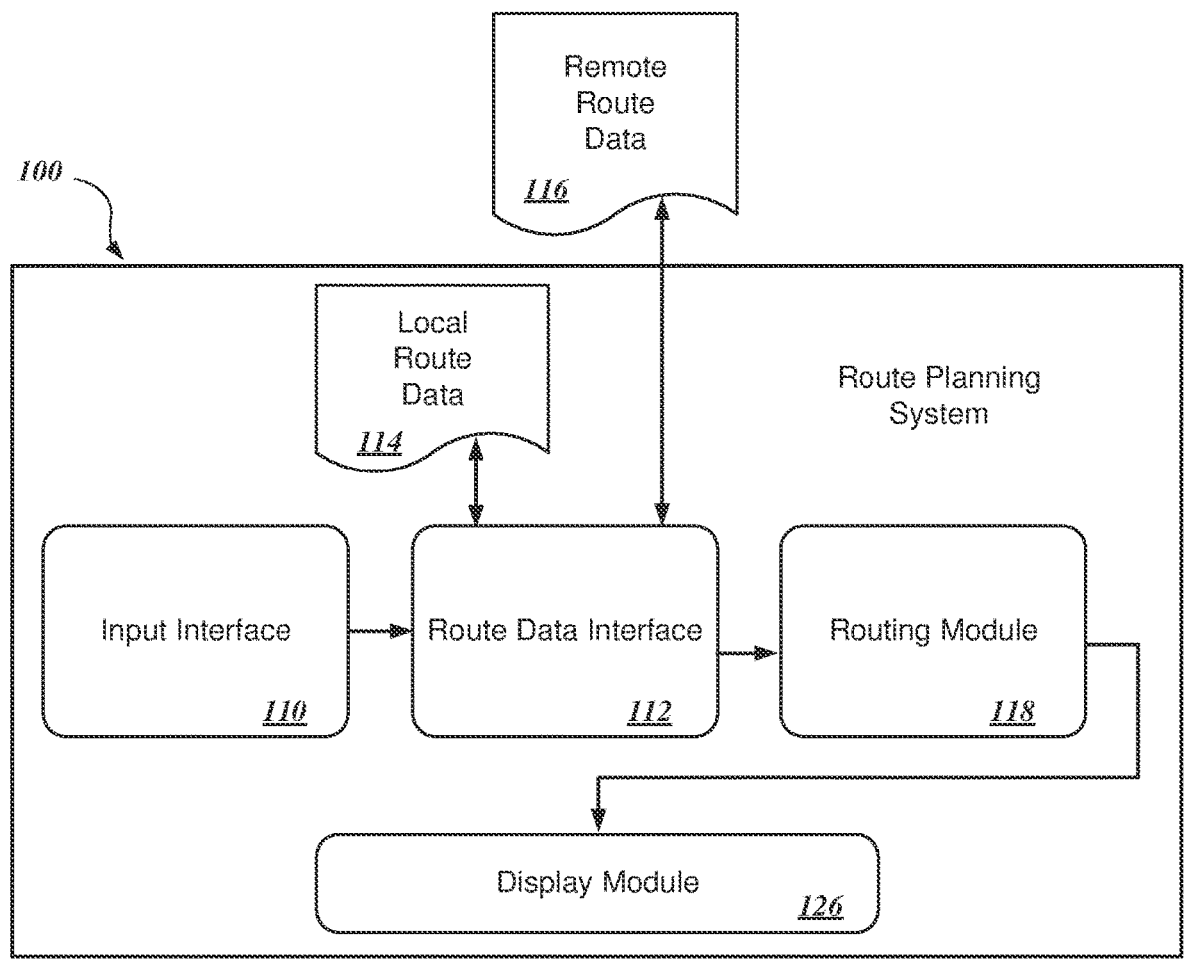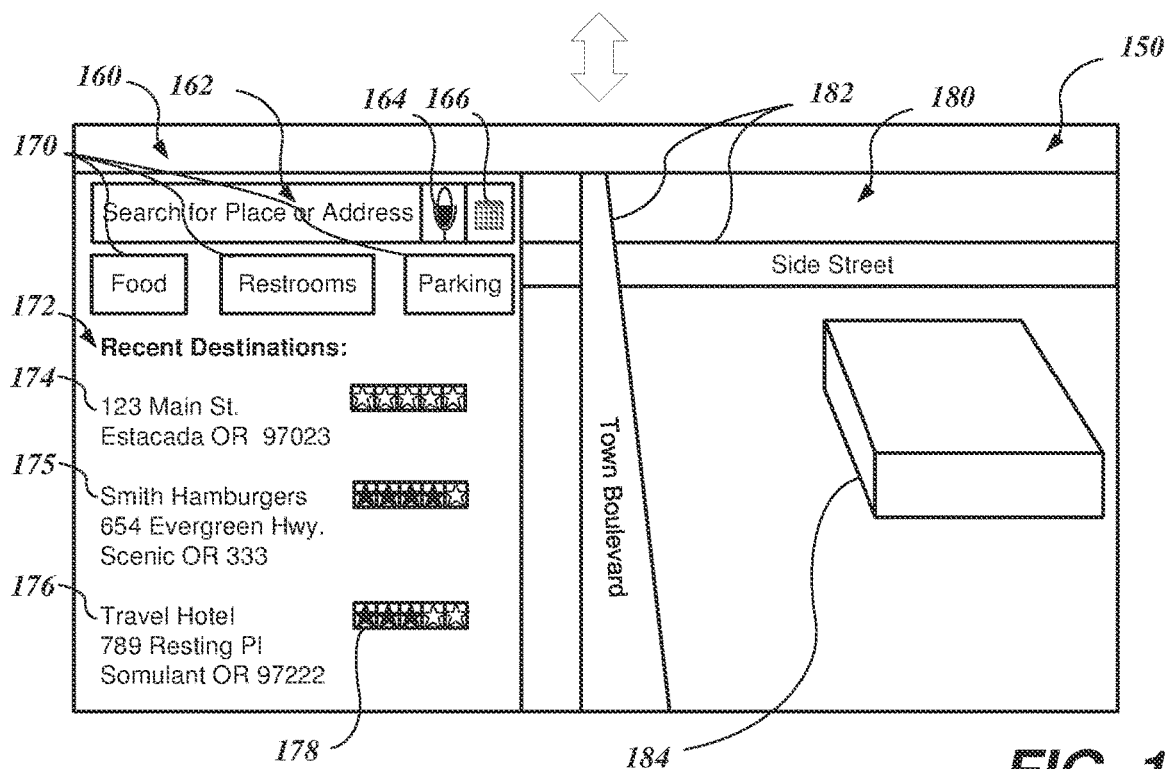
FIG. 1

DESTINATION SELECTION INCORPORATING TIME CONSTRAINTS

CROSS-REFERENCE TO RELATED APPLICATION

The present disclosure is a continuation (CON) of co-pending U.S. patent application Ser. No. 17/083,359, filed on Oct. 29, 2020, and entitled "DESTINATION SELECTION INCORPORATING TIME CONSTRAINTS," the contents of which are incorporated in full by reference herein.

INTRODUCTION

The present disclosure relates to systems, vehicles, and methods for receiving inputs indicative of a destination and a potential intermediate destination and determining a time potentially available at the intermediate destination.

The statements in this section merely provide background information related to the present disclosure and may not constitute prior art.

Navigation systems such as Global Positioning System (GPS) and/or other geolocation devices have become relatively commonplace. A user can provide a navigation system with a desired location, and the system will provide directions from a current location or another specified starting location to a selected destination. Navigations systems also may inform the user of the distance to the destination and an anticipated length of time for the trip. The functions of navigation systems may be provided by standalone devices, vehicle systems, or applications supported by smartphones, smartwatches, or other computing devices to guide drivers or pedestrians on their way.

Many navigation systems also allow a user to specify one or more intermediate destinations between a starting location and a final destination. These systems may provide a total travel distance and/or total travel time representing the distances and/or times for each part of the journey. However, these systems leave it to the user to determine when to depart, where to stop, how long the user can stop, and other details in trying to plan the entirety of the trip.

SUMMARY

Disclosed embodiments include systems, vehicles, and methods for receiving inputs indicative of a destination and a potential intermediate destination and determining a time potentially available at the intermediate destination.

In an illustrative embodiment, a system includes a computing device having computer-readable media storing computer-executable instructions configured to cause the computing device to receive a first input indicative of a destination. A second input is received that is indicative of a desired arrival time at the destination. A third input is received that is indicative of an intermediate destination to be visited before traveling to the destination. A first travel time to the intermediate destination, a second travel time to the destination, and a time available at the intermediate destination are determined. The time available at the intermediate destination is communicated to a user.

In another illustrative embodiment, a vehicle includes a cabin configured to receive at least one occupant. A drive system is configured to motivate, accelerate, decelerate, stop, and steer the vehicle. The vehicle also includes a computing device having computer-readable media storing computer-executable instructions configured to cause the computing device to receive a first input indicative of a destination. A second input is received that is indicative of a desired arrival time at the destination. A third input is received that is indicative of an intermediate destination to be visited before traveling to the destination. A first travel time to the intermediate destination, a second travel time to the destination, and a time available at the intermediate destination are determined. The time available at the intermediate destination is communicated to a user.

In another illustrative embodiment, in an illustrative computer-implemented method, a first input is received that is indicative of a destination. A second input is received that is indicative of a desired arrival time at the destination. A third input is received that is indicative of an intermediate destination to be visited before traveling to the destination. A first travel time to the intermediate destination, a second travel time to the destination, and a time available at the intermediate destination are determined. The time available at the intermediate destination is communicated to a user.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIG. 1 is a block diagram of an illustrative system for receiving inputs indicative of a destination and a potential intermediate destination and determining a time potentially available at the intermediate destination;

DETAILED DESCRIPTION

Figure 2:
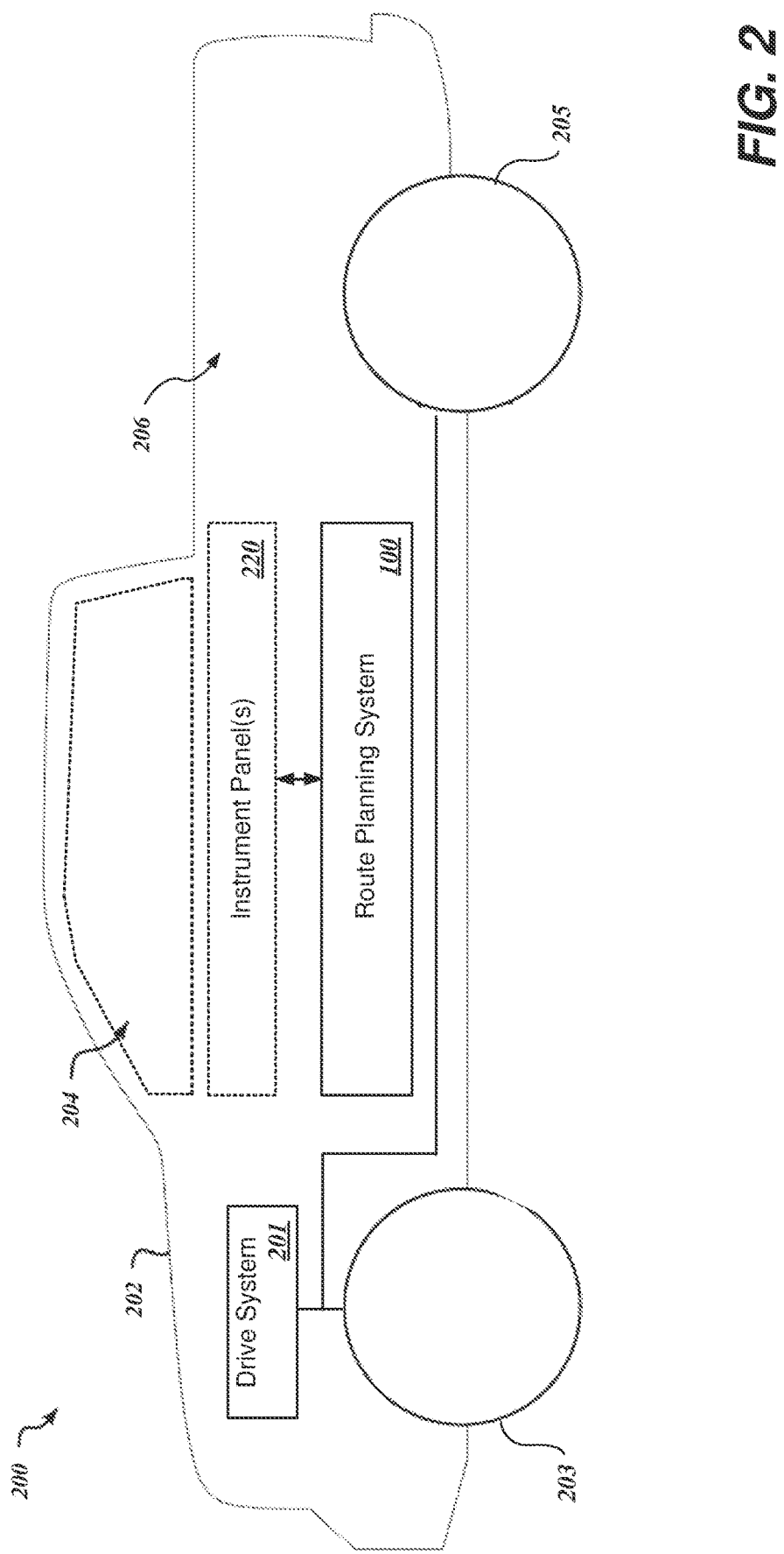
FIG. 2 is a block diagram in partial schematic form of an illustrative vehicle that includes the system of FIG. 1.

The following description explains, by way of illustration only and not of limitation, various embodiments for receiving inputs indicative of a destination and a potential intermediate destination and determining a time potentially available at the intermediate destination. It will be noted that the first digit of three-digit reference numbers and the first two digits of four-digit reference numbers correspond to the figure number in which the element first appears.

By way of a non-limiting introduction and overview, in various embodiments, inputs are received identifying a destination, a desired arrival time at the destination, and an intermediate destination to be visited prior to traveling to the destination. The user may also specify a type of intermediate destination, such as "restaurant," and the system may provide a list of restaurants from which the user may choose. The system may determine routes and travel times to the intermediate destination and the destination, then determine a time that is available to spend at the destination. Given the desired arrival time at the destination and the travel time to reach the destination, when providing a list of possible intermediate destinations of a specified type, the system may eliminate intermediate destinations the user cannot visit while still reaching the destination by the desired arrival time. In this way, the user need not try to mentally calculate or track the travel times to determine whether the user has time to visit the intermediate destination or how much time the user might have to spend there. In various embodiments, the system also may determine whether a vehicle in which the user is travelling has sufficient fuel or energy (i.e., gasoline or electrical charge) to reach the destination, and the system may consider the time to reach and use a station to replenish the vehicle's energy in determining what time may be available at the intermediate destination.

Now that a general overview has been given, details of various embodiments will be explained by way of non-limiting examples given by way of illustration only and not of limitation.

Referring to FIG. 1, in various embodiments a navigation system with time constraint management 100 (the "system") includes various subsystems for identifying a potential intermediate destination and determining a time potentially available at the intermediate destination. The system 100, as further described below, may be implemented on a computing device having computer-readable media storing instructions configured to cause the computing system to perform the functions herein described. An illustrative computing device is described below.

The system 100 includes an input interface 110 that enables a traveler or other user to provide input identifying a destination, a desired arrival time at the destination, and a potential intermediate destination. The input interface 110 may enable the user to identify a destination from a list of previously entered destinations or by entering an address and/or coordinates of the destination. The input interface 110 also enables the user to enter an arrival time by which the user wishes to reach the destination. The input interface 110 also enables the user to identify a desired intermediate destination or a type of intermediate destination (e.g., "food," "restroom," etc.). Operation of the input interface 110 is further described below.

Using the user input received via the input interface 110, a route data interface 112 enables the system 100 to access a store of route data for an area that may encompass the trip. The route data may include map or other roadway data in the area that may be used to identify one or more available routes of travel between an origin and a destination in the area. The route data may include a local store of route data 114 that may be maintained within the system 100. In various embodiments, the local store of route data 114 may include, for example, map data for a nation in which the user resides and/or in which the system 100 is initially deployed, as well as map data for one or more neighboring nations.

The route data interface 112 also may engage a remote store of route data 116. The remote store of route data 116 may be used to update the local store of route data 114 to present map information that represents new or changed roads or road conditions, and/or data regarding current road or traffic conditions. The remote store of route data 116 also may be used to augment the local store of route data 114 to include map data for one or more additional areas that may not be presently included in the local store of route data 114. The remote store of route data 116 may be maintained on a remote computing system that is accessible by the system 100, as further described below.

A routing module 118 uses the data indicative of the trip received by the input interface 110 and the route data accessible by the route data interface 112 to identify one or more routes the user may travel from the origin to the destination, the intermediate destination, and other locations (e.g., a station where a user can refuel or recharge a vehicle). In various embodiments, the routing module 118 may employ a vector map of road segments with defined end points of each segment. A process such as Dijkstra's algorithm, an A* algorithm, or another suitable method may be used to determine one or more shortest path trees between the origin and destination. Based on user preferences, such as preferences for or against freeways, the desire to avoid toll roads, and the like, various possible segments may be eliminated from consideration before determining the shortest path tree. The user may be presented with an option to choose from more than one available route.

Each of the one or more routes presented by the routing module 118 is associated with a timeline. The timeline incorporates an expected time of travel between the origin, the destination, and/or including a trip to the intermediate destination based on a total time to travel each of the segments included in the route at an anticipated travel speed. The anticipated travel speed may be based on a combination of the legal speed limit for each of the segments, anticipated or actual traffic delays, and one or more additional factors. A route may be selected from the one or more routes provided by the routing module 118 in order to reach the destination by the desired arrival time. Also, using the timeline, it may be determined whether there is time and/or how much time is potentially available to spend at the intermediate destination.

The input interface 110 and the routing module 118 interoperate with a display module 126 to receive input from and/or provide information to the user. In various embodiments, the display module 126 may include a touchscreen display that enables a user to provide input and receive output from a single device, as is commonly used in GPS navigation devices incorporated into vehicles, standalone GPS navigation devices, smartphones, and smartwatches.

To provide a further example, a navigation display 150 shows various features that may be engaged by a user to provide input and receive output from the system 100 via the display module 126. An input section 160 enables the user to control or enter information into the system 100. For example, the input section 160 may include a location input 162 that enables the user to enter an address, coordinates, or a name of a desired destination. The name may be the name of a business, such as a name of a hotel, restaurant, etc., or the name of a previously-saved location, such as "home," "office," etc. When the user engages the location input 162, such as by touching the location input 162, an on-screen keyboard (not shown) may be displayed to enable the user to key in the address, coordinates, or name. Alternatively, by tapping a voice input control 164, a user may provide verbal input for the address, coordinates, etc. A user also may speak a "wake word" to initiate verbal input to the system 100.

In various embodiments, the input section 160 also may include destination types 170 that enable a user to specify a type of destination or intermediate destination. The destination types 170 may include "food," "restrooms," "parking," etc. Some of the destination types 170, when selected, may invoke further option selections. For example, upon selecting the "food" option, the user may be presented with options for types of food (e.g., "pizza," "fast food," etc.). The input section 160 also may present a list of recently entered or visited destinations 172. The list of recent destinations 172 may include a number of destinations 174-176 including private addresses or business establishments. For business establishments, a rating 178, such as a star rating, may be provided from the user's own prior ratings or from a ratings service. The list of recent destinations 172 may allow a user to tap on or otherwise select one of the recent destinations 174-176. Being able to select from the list of recent destinations 172 may be convenient, for example, when the user is on a business trip and is traveling back and forth from a hotel to a business to be visited.

An output section 180 shows a map of streets 182 on which the user is traveling or in the user's vicinity. A route to be travelled and/or turn-by-turn directions (not shown in FIG. 1) may be provided relative to the map 182. The output section 180 also may show nearby locations 184, which may include businesses, landmarks, and other places. It will be appreciated that the output section 180, although potentially primarily providing information to the user, may also receive input. For example, the user may tap on a particular route, street, or location to select a route or destination. The navigation display 150 is used as a basis for describing operation of the system 100, as further described below.

In various embodiments, the navigation display 150 of the system 100 present a schedule input 166. As further explained below, the schedule input 166 may be used to initiate the functions of selecting a destination, a desired time of arrival at the destination, and, optionally, the scheduling of one or more intermediate destinations or stops. In various embodiments, the scheduling option may be initiated by voice commands as well as by engaging the schedule input 166. Operation of the scheduling option is explained in detail below with reference to FIGS. 6-14.

Referring to FIG. 2, the navigation system with time constraint management 100 of FIG. 1 may be integrated with a vehicle 200 or transportable aboard a vehicle 200. In various embodiments, the vehicle 200 includes a body 202 that may support a cabin 204 capable of accommodating an operator, one or more passengers, and/or cargo. In various embodiments, the vehicle 200 may be controlled by an operator or the vehicle 200 may be a self-driving vehicle. The vehicle 200 may be an autonomous vehicle that travels without an operator to transport passengers and/or cargo. The body 202 also may include a cargo area 206 separate from the cabin 204, such as a trunk or a truckbed, capable of transporting cargo. The vehicle 200 includes a drive system 201 selectively engageable with one or more front wheels 203 and/or one or more rear wheels 205 to motivate, accelerate, decelerate, stop, and steer the vehicle 200. The drive system 201 may include an electrically-powered system, a fossil-fuel-powered system, a hybrid system using both electric power and fossil fuels, or another type of power source.

In various embodiments, the system 100 of FIG. 1 may be an integral part of the vehicle 200, including a computing system that is part of the vehicle 200, powered by a power system aboard the vehicle 200 and integrated with one or more instrument panels 220 disposed in the cabin 204 of the vehicle 200. The instrument panels 220 might include various operational gauges, such as a speedometer, tachometer, and odometer, climate controls, entertainment controls, and other instruments along with presenting the navigation display 150 (FIG. 1).

In various embodiments, the system 100 may include a separate computing device transportable aboard the vehicle 200, such as a smartphone, smartwatch, tablet computer, or other portable computing device. In various embodiments, the navigation system with time constraint management 100 may include a computing device that is usable separate from the vehicle 200, such as a portable or non-portable personal computer usable for trip planning. Consequently, the system 100 may be used by pedestrians or other users who are not traveling by vehicle.

Figure 3:
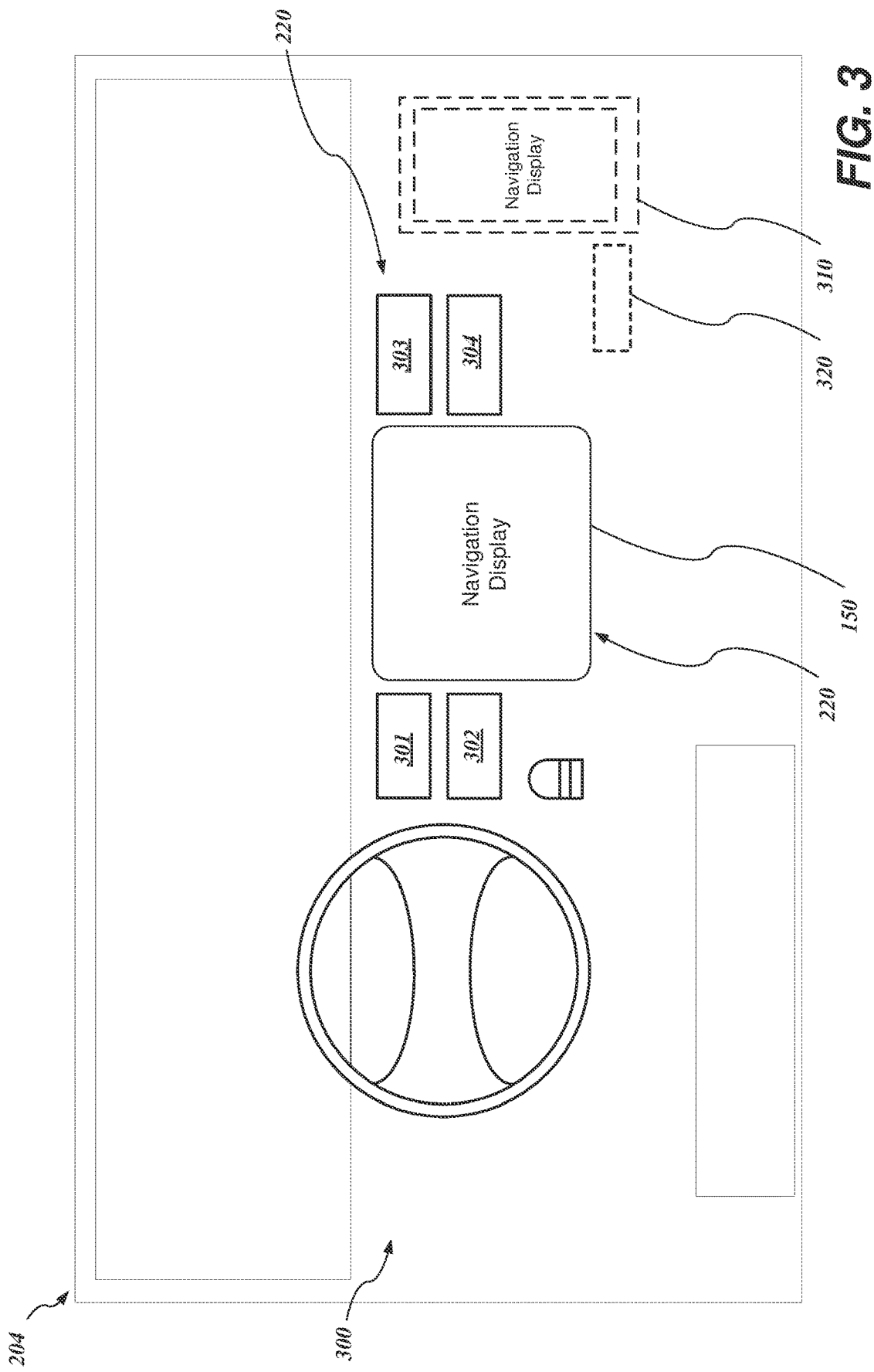
FIG. 3 is a perspective view of a cabin of a vehicle with access to the system of FIG. 1.

Referring to FIG. 3, a dashboard 300 within the cabin 204 shows one of the instrument panels 220 (FIG. 2) that includes the navigation display 150. In various embodiments, as previously described, the navigation display 150 may include a touchscreen display that enables an individual to directly engage the navigation display 150 to interact with the navigation display 150, as further described below. In various embodiments where the navigation display 150 does not include a touchscreen display, controls 301-304 adjacent to the navigation display 150 may enable user engagement with the navigation display 150 to move a cursor, enter characters, or perform other control functions. In various embodiments, the system 100 is configured to receive voice inputs to interact with the navigation display. Voice input may be received in response to activation of a voice input control 164 (FIG. 1) or by using a wake word.

In various embodiments, instead of or in addition to using the navigation display 150 on the dashboard 300, a portable computing device 310, such as a smartphone, smartwatch, tablet computer, or other portable computing device, may execute an application that operates to provide functions of the system 100. The portable computing device 310 may operate alone or in some combination with a remote computing system, as further explained below. The portable computing device 310 may engage with other systems aboard the vehicle 200, such as a speedometer or other devices, via an interface 320. The interface 320 may include a wireless interface, such as a Bluetooth or Wi-Fi interface, or a wired interface using a USB or other wired connection. In various embodiments, the interface 320 may enable the portable computing device 310 to provide input to a self-driving system aboard the vehicle 200 to guide the vehicle 200 to one or more destinations.

Figure 4:
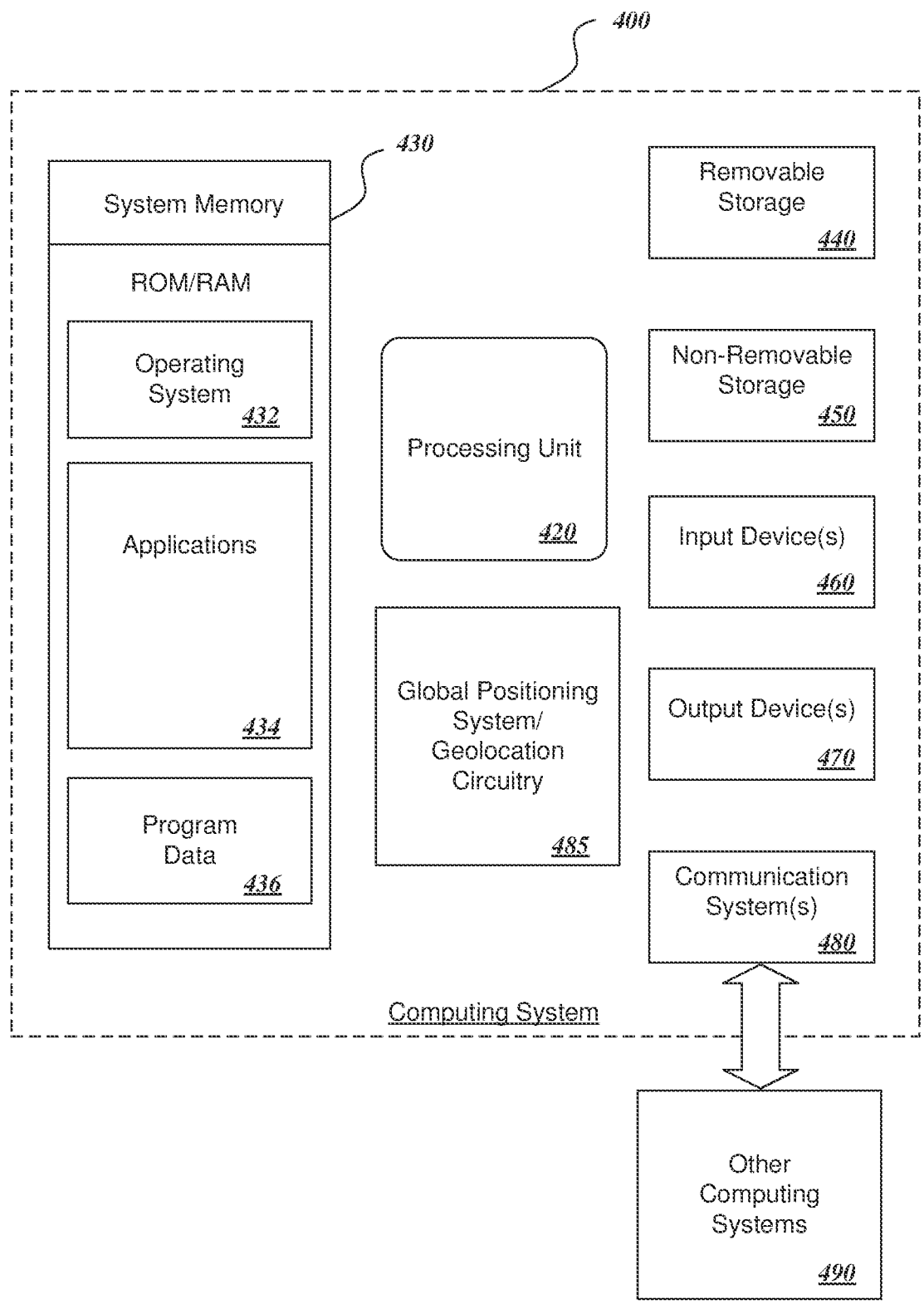
FIG. 4 is a block diagram of an illustrative computing system for performing functions of the system of FIG. 1.

Referring additionally to FIG. 4 and given by way of example only and not of limitation, an illustrative computing device 400 may be used aboard the vehicle 200 (FIG. 2) to perform the functions of the navigation system with time constraint management 100 (FIG. 1). In various embodiments, the computing device 400 typically includes at least one processing unit 420 and a system memory 430. Depending on the exact configuration and type of computing device, the system memory 430 may be volatile memory, such as random-access memory ("RAM"), non-volatile memory, such as read-only memory ("ROM"), flash memory, and the like, or some combination of volatile memory and non-volatile memory. The system memory 430 typically maintains an operating system 432, one or more applications 434—such as computer-executable instructions to support operation of the integrated route map display system 100— and program data 436. The operating system 432 may include any number of operating systems executable on desktop or portable devices including, but not limited to, Linux, Microsoft Windows®, Apple OS®, or Android®, or a proprietary operating system.

The computing device 400 may also have additional features or functionality. For example, the computing device 400 may also include additional data storage devices (removable and/or non-removable) such as, for example, magnetic disks, optical disks, tape, or flash memory. Such additional storage is illustrated in FIG. 4 by removable storage 440 and non-removable storage 450. Computer storage media may include volatile and non-volatile, removable and non-removable media implemented in any method or technology for storage of information, such as computer-readable instructions, data structures, program modules or other data. The system memory 430, the removable storage 440, and the non-removable storage 450 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 400. Any such computer storage media may be part of the computing device 400.

The computing device 400 may also have input device(s) 460 such as a keyboard, stylus, voice input device, touchscreen input device, etc. Output device(s) 470 such as a display, speakers, short-range transceivers such as a Bluetooth transceiver, etc., may also be included. The computing device 400 also may include one or more communication systems 480 that allow the computing device 400 to communicate with other computing systems 490, as further described below. As previously mentioned, the communication system 480 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

In further reference to FIG. 4, the computing device 400 may include global positioning system ("GPS")/geolocation circuitry 485 that can automatically discern its location based on relative positions to multiple GPS satellites or other signal sources, such as cellphone towers. As described further below, GPS/geolocation circuitry 485 may be used to determine a location of the vehicle 200. In various embodiments, the GPS/geolocation circuitry 485 may be used to determine a position of the vehicle 200 for generation and analysis of the navigation display 150.

Figure 5:
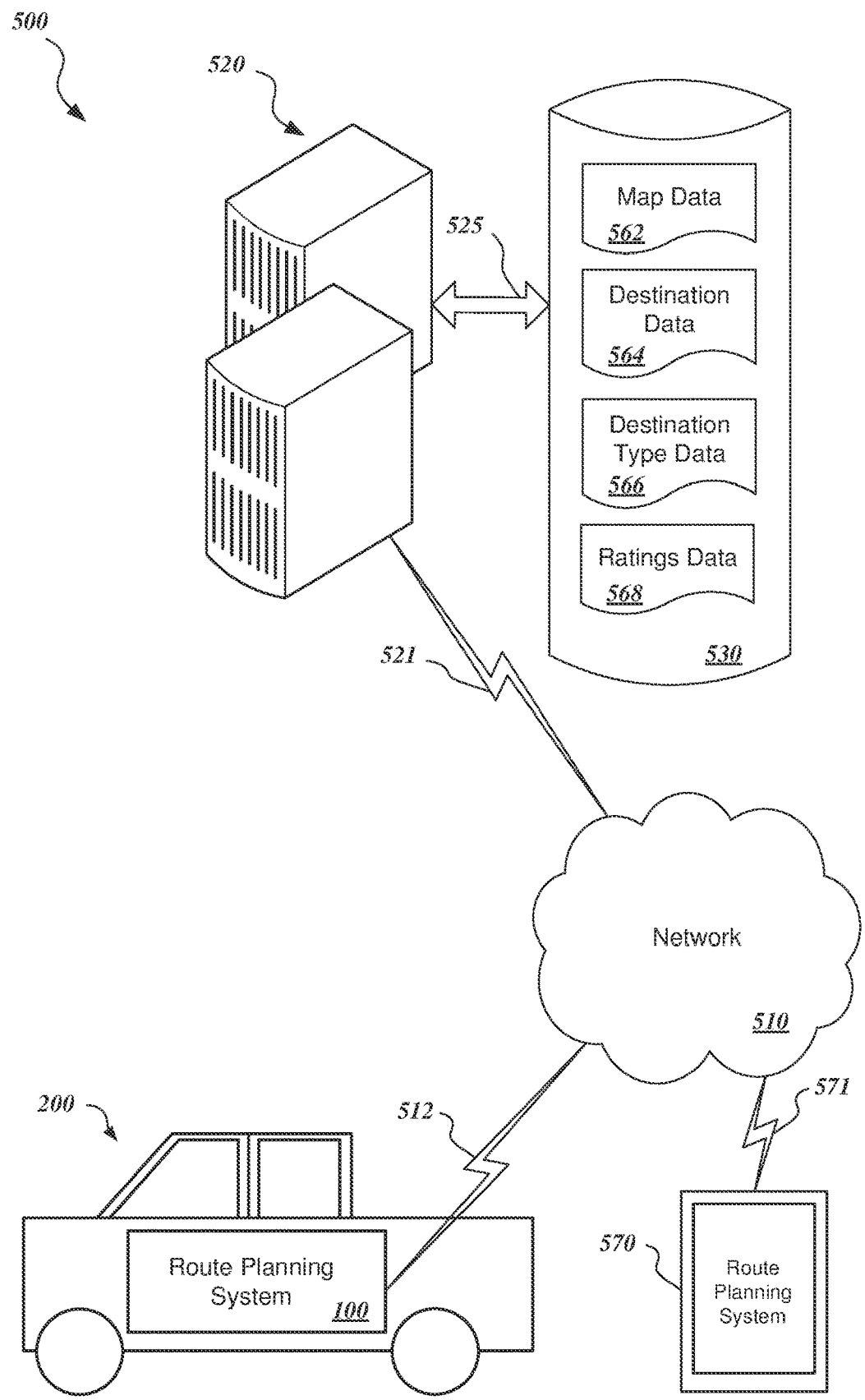
FIG. 5 is a block diagram of one or more illustrative systems of FIG. 1 communicating with one or more remote systems.

In addition to one or more onboard computing systems, various embodiments may communicate with remote computing systems to perform the functions herein described. Referring to FIG. 5, an operating environment 500 may include one or more sets or remote computing systems 520. The remote computing system 520 may support a map or route data service. The remote computing system 520 may provide an additional source of mapping and/or navigational data, as well as a directory of destinations by name, address, and/or coordinates that the user may wish to travel to as a destination or intermediate destination. Although shown as a single computing system in FIG. 5, it will be appreciated that the remote computing system 520 may include one or more computing systems residing at one or more locations.

The remote computing system 520 each may include a server or server farm and may communicate with the network 510 over wired and/or wireless communications links 521, respectively. The remote computing system 520 may access programming and data used to perform their functions over high-speed buses 525 to interact with data storage 530. In various embodiments, the remote computing system 520 may service requests for map data 562, destination data 564 that may be stored via location or coordinates, and/or destination type data 566 that may retrieve potential destinations and/or intermediate destinations based on a type specified by the user. The data storage 530 also may include ratings data 568 that maintains a quality assessment of various locations. The ratings data 568 may be created by the user or be drawn from an online ratings service that collects ratings from visitors or patrons of the locations. It will be appreciated that some or all of the data maintained in the data storage 300 may be accessible from or stored in a user's computing system without accessing the data storage 530 over the network 510.

The system 100 may be disposed aboard the vehicle 200. As previously described, the system 100 may be supported by a computing device integrated with the vehicle 200 or supported by a portable computing device carried aboard the vehicle 200. The system 100 may communicate over the network 510 via a communications link 512 to access the remote computing system 520 to access the map data 562, the destination data 564, and/or the destination type data 566. The communications link 512 may include a wireless communications link to enable mobile communications with the system 100 aboard the vehicle 200 or may include a wired link when the vehicle 200 is stopped.

The system 100 also may be supported by a computing system 570 that is not integrated with or transported aboard the vehicle 200. The computing system 570 may include a portable computing system, such as a portable computer, tablet computer, smartphone, or smartwatch and may be used to generate the navigation display 150 (FIG. 1). The computing system 570 may communicate over the network 510 via a communications link 571 to access the remote computing system 520 to access the map data 562, the destination data 564, and/or the destination type data 566. The communications link 571 may include a wireless or a wired communications link.

Figure 6:
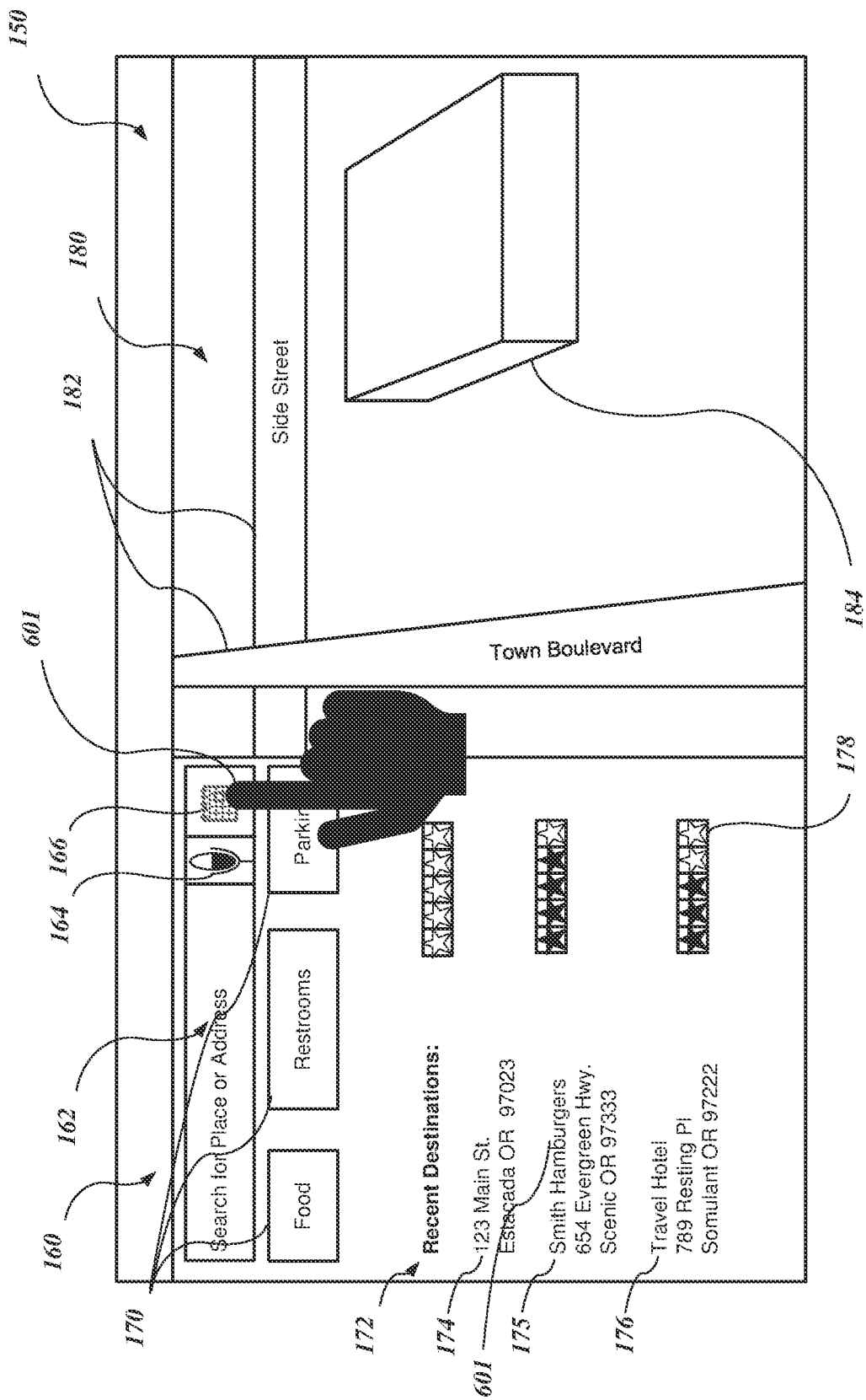
FIGS. 6-14 are block diagrams of illustrative screen displays for engaging the system of FIG. 1.

Operation of the system 100 is further described with reference to the following figures. Referring to FIG. 6, the navigation display 150 enables a user to identify one or more destinations, including a final destination and a potential intermediate destination. As previously described, the user may use physically engage (such as with a finger 601) the location input 162 on the navigation display to enter an address, coordinates, or a name of a desired destination. The user may use an on-screen keyboard (not shown) to enter the desired destination or use a wake word or physically engage the voice input control 164 to provide verbal input for the address, coordinates, etc. The user also may select one of the locations 174 listed in the recent destinations list 172. The user also may begin by selecting one of the destination types 170, such as "food," "restrooms," "parking," etc.

To provide an operational example, it is assumed that the user is visiting a city with which the user is not highly familiar. For further sake of example, it is further assumed that the user is staying with a friend or at "bed & breakfast" type of lodging located at 123 Main St. in Estacada, Oregon. It is further assumed that the user may need to return for courtesy or by mandate by 11:00 p.m., or merely that the user is determined to return to the lodging by 11:00 p.m. However, on the way to the destination, the user wishes to stop to have dinner. In order to plan his trip, the user selects the schedule input 166. In various embodiments, the user engages the schedule input 166 by tapping the schedule input 166 with a finger 601.

Figure 7:
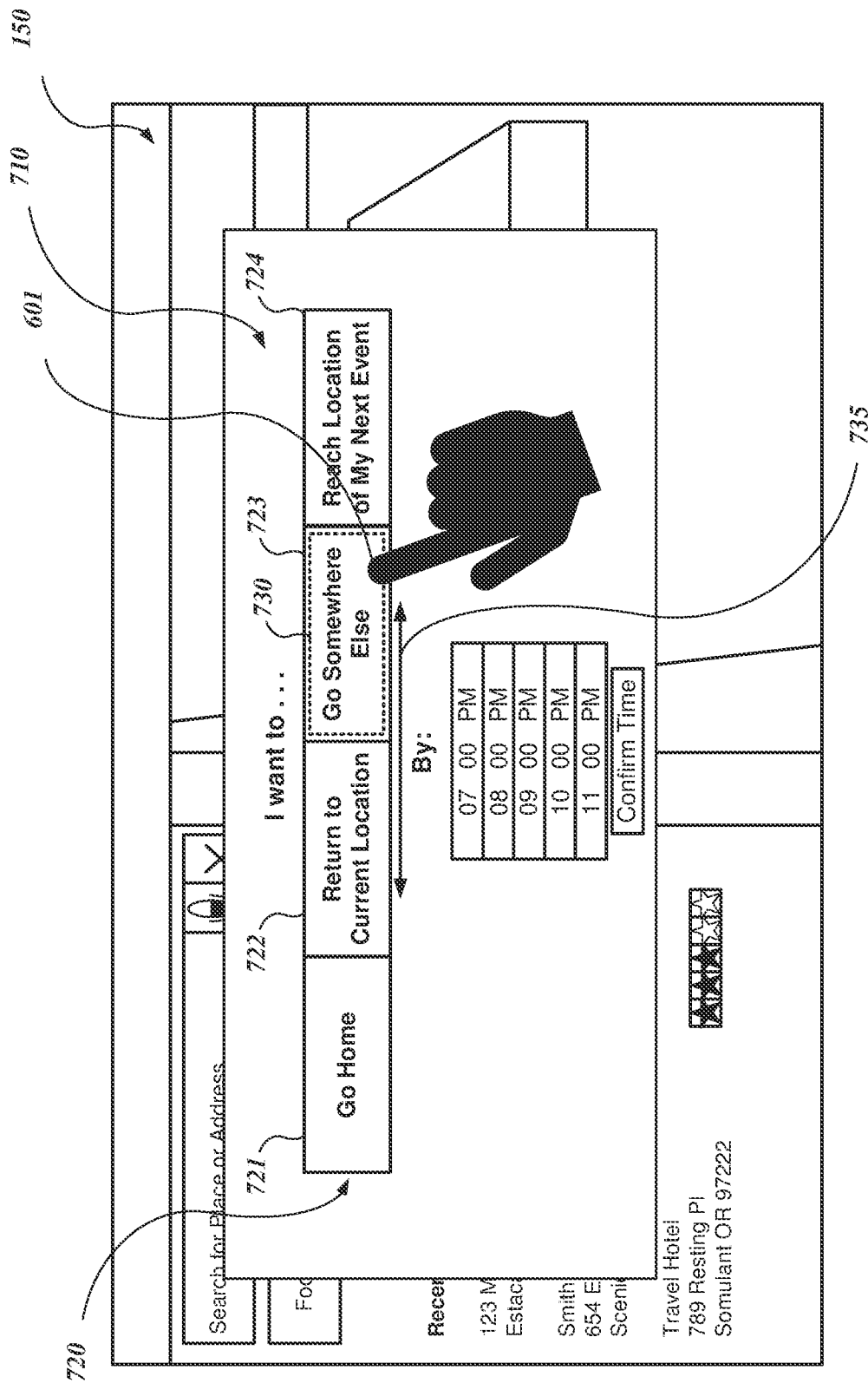

Referring to FIG. 7, in various embodiments, a scheduling window 710 is presented instead of or overlaying the navigation display 150. The scheduling window 710 includes a destination menu 720 including a range of destination options 721-724. For example, the destination menu 720 may include a "Go Home" option 721, which would set the destination to a user's preset home address. The destination menu 720 includes a "Return to Current Location" option 722 in case the user wants to specify an intermediate destination (e.g., a restaurant or other location) and return to the user's starting location. The destination menu 720 includes a "Go Somewhere else" option 723 to choose another destination. The destination menu 720 also includes a "Reach Location of My Next Event" option 724, which would enable a user to link the system 100 to the user's calendar to procure directions to the next event. In various embodiments, to choose an option from the destination menu 720, the user may tap on a selected option by tapping the selected option with a finger 601, such as the "Go Somewhere Else" option 723 as shown in FIG. 7. In various embodiments, the user may choose an option from the destination menu 720 by sliding a cursor 730 along the destination menu using the finger 601 or an external control (e.g., controls 301-304 of FIG. 3) to move the cursor along a dimension 735 to choose an option from the destination menu 720. In various embodiments, a user also may use voice commands to make a selection from the destination menu 720.

Figure 8:
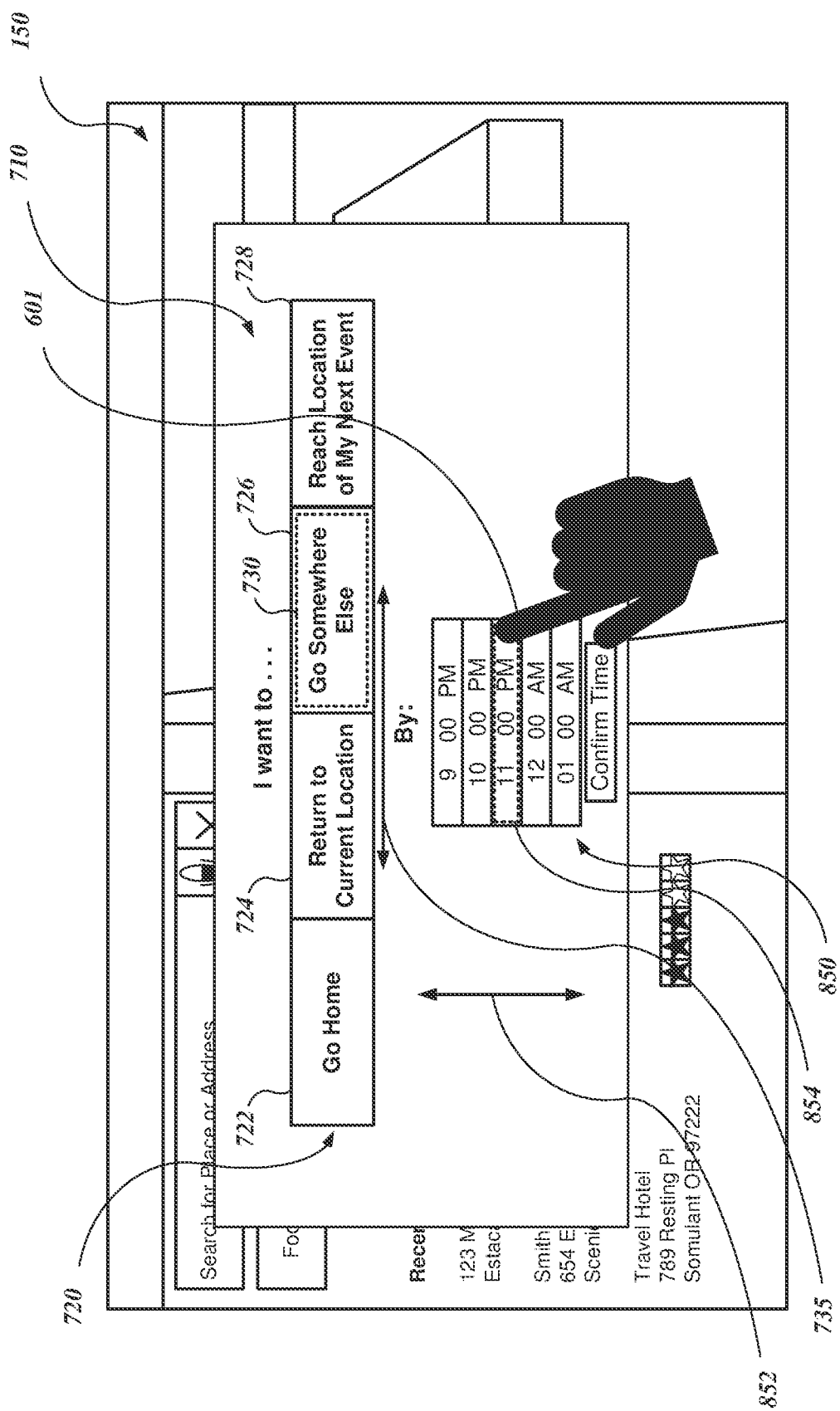

Referring to FIG. 8, in addition to choosing a destination from the destination menu 720 of the scheduling window 710, the user also chooses a desired arrival time from an arrival time menu 850. In various embodiments, the arrival time menu 850 enables a user to use the finger 601 to scroll the arrival time menu 850 by sliding the finger 601 along a dimension 852 until a desired time appears in a selection frame 854. In various embodiments, the user may manipulate the arrival time menu 850 to present the desired arrival time to the minute or within a range of a few minutes within each hour. In other embodiments, the user may engage an external control (e.g., 301-304 of FIG. 3) to manipulate the arrival time menu 850 until the desired arrival time is presented in the selection frame 854. In various embodiments, a user also may use voice commands to make a selection from the arrival time menu 850.

Figure 9:
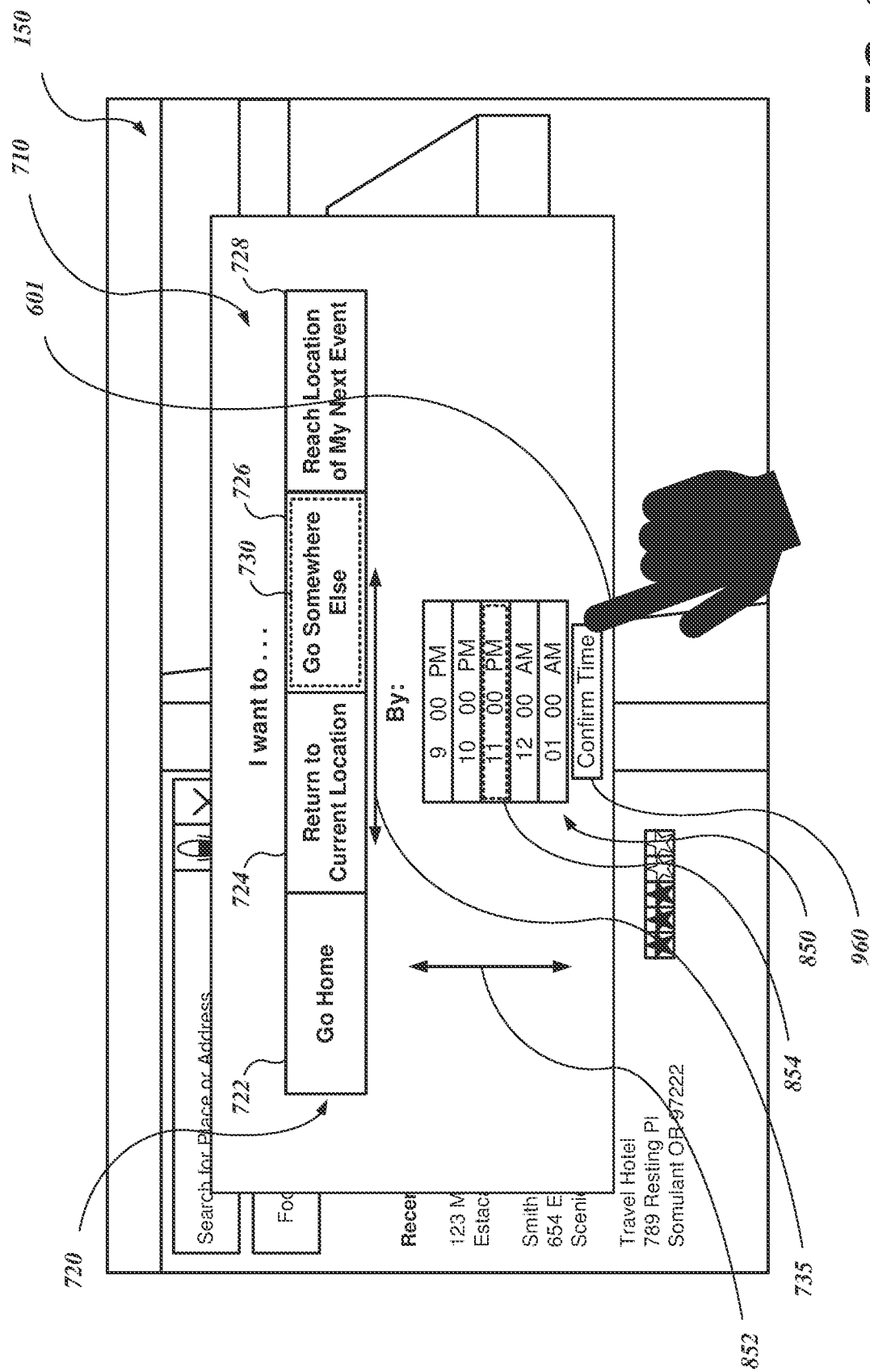

Referring to FIG. 9, after the user finishes making destination and timing selections, the user may engage the system to proceed to a next step by engaging a confirm option 960 using the finger 601 or an external control (e.g., controls 301-304 of FIG. 3), or by providing a voice command. Continuing with the previously-stated example of the user wanting to return to his lodging by 11:00 p.m., the user chooses a desired arrival time of 11:00 p.m. with the selection frame 854 of the arrival time menu 850.

Figure 10:
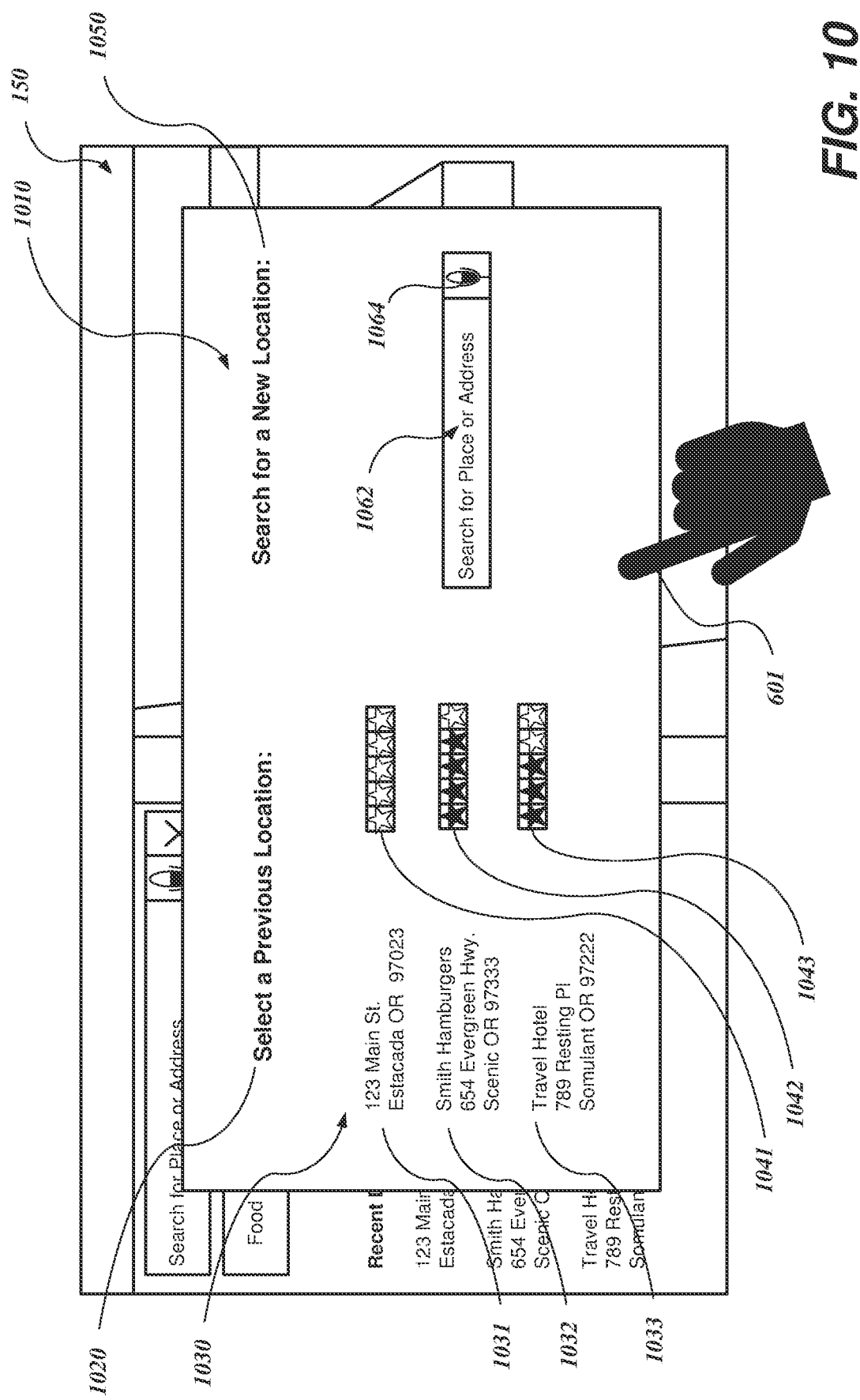

Referring to FIG. 10, in response to selecting the confirm option 960, the user is presented with a destination menu 1010. In various embodiments, the destination menu 1010 may include a "Select a Previous Location" option 1020. The "Select a Previous Location" option 1020 may include a list of previously-visited or previously-entered locations 1030, such as locations 1031-1033. Although the list of previously-visited or previously-entered locations 1030 includes only a few entries, it will be appreciated that the list 1030 may be scrollable using the finger 610 or an external control (e.g., controls 301-304 of FIG. 3) or by providing a voice command to access additional previously-visited or previously-entered locations. In various embodiments, when applicable, each of the listed locations 1031-1033 may be associated with a rating 1041-1043, respectively, provided by a ratings service or previously assigned by the user. The user may select from the list 1030 with the finger 601, an external control (e.g., controls 301-304 of FIG. 3), or by providing a voice command.

The destination menu 1010 also may include a "Search for New Location" option 1050. The search for new location option 1050 includes a search input 1062 in which the user can enter a name, address, or coordinates for a location. The search may be commenced by engaging the search input 1062 with the finger 601 to open an on-screen keyboard (not shown), by using the finger 601 to activate a voice input control 1064 to receive voice input, by using a wake word to signal the system to receive voice input, or by other processes.

Figure 11:
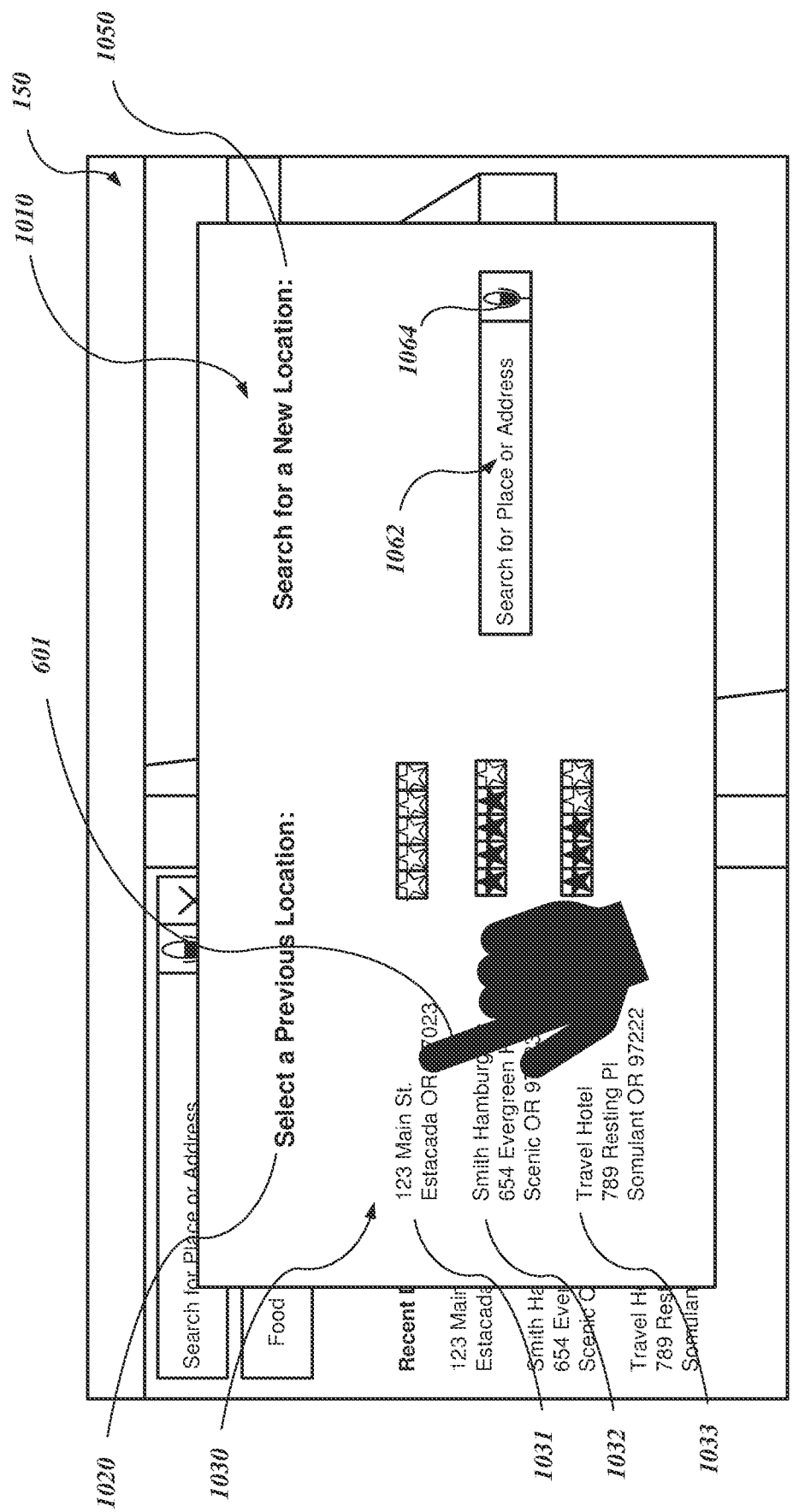

Referring to FIG. 11, the user specifies the destination to which the user desires to return by the desired arrival time previously specified as described with reference to FIGS. 7-9. Continuing with the previously-described example, the user wishes to return to the user's lodging by 11:00 p.m., as specified with the selection frame 854 of the arrival time menu 850. From either the "Select a Previous Location" option 1020 or the "Search for New Location" option 1050, the user chooses a location by which the user desires to return by 11:00 p.m. In this example, the user chooses the listed location 1031 which is the address of the user's lodging at 123 Main St. in Estacada, Oregon.

Figure 12:
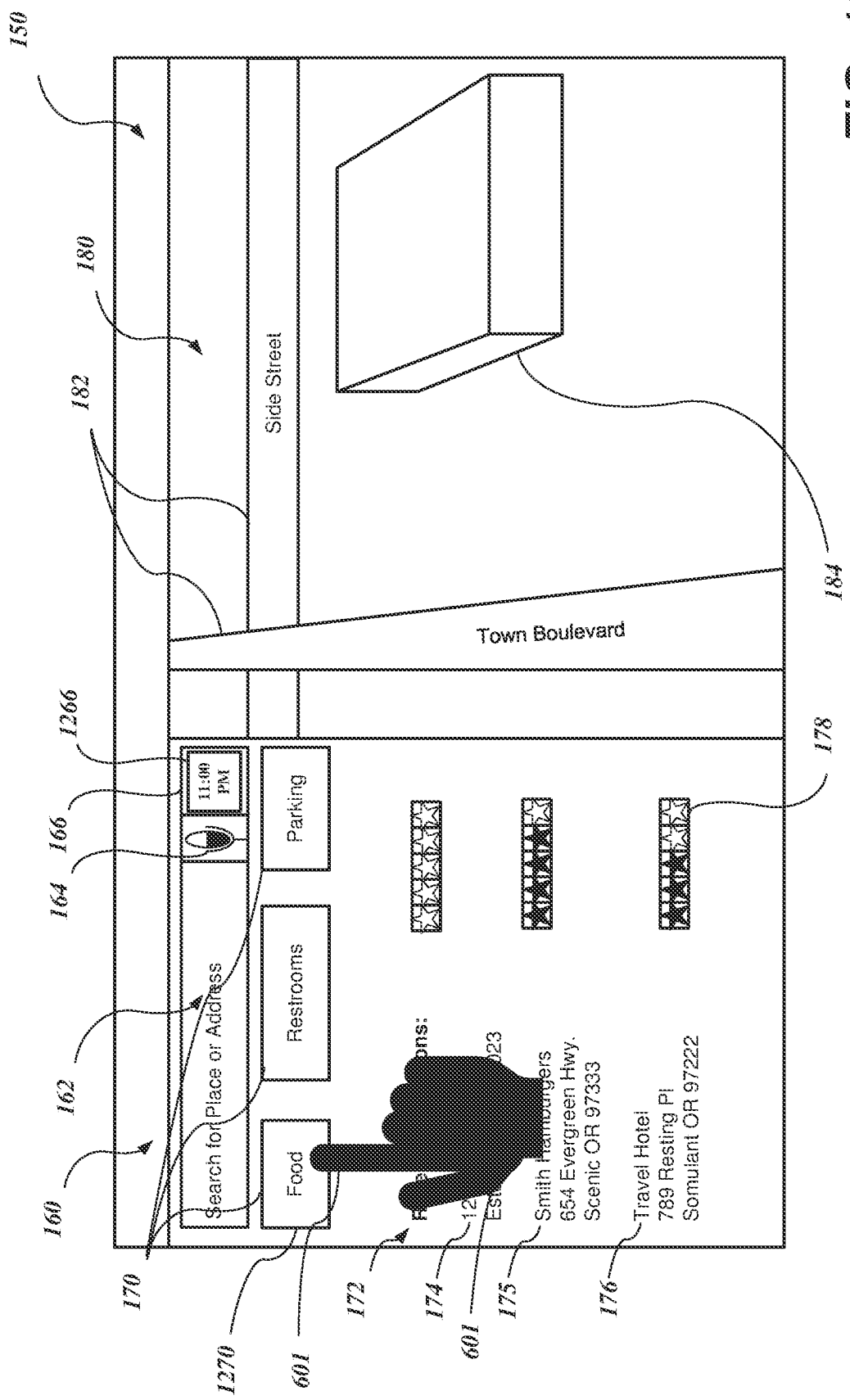

Referring to FIG. 12, in response to the user having chosen a desired arrival time and the destination to be reached by that time as described with reference to FIGS. 7-11, the system 100 returns the user to the navigation display 150 where the user may have an option to choose to stop at an intermediate destination. Continuing with the previous example, the user wishes to stop for dinner before returning to the user's lodging at 123 Main St. in Estacada, Oregon by 11:00 p.m.

The navigation display 150 of FIG. 12 is similar to that of the navigation display of FIG. 6 in which the user first engaged the system 100 to select the desired arrival time and the destination. A difference is that, because a desired arrival time at a destination has been selected, the schedule input 166 is overlaid with the desired arrival time indicator 1266. The desired arrival time indicator 1266 both indicates that the system 100 is operating to guide the user to a specified destination by the desired arrival time and/or to remind the user of the desired arrival time. To select a potential intermediate destination, the user may enter the name or address of a location in the location input 162 (or activate the voice input control 164 or use a wake word to do so), select from one of the list of recent destinations 172, or select one of the destination types 170. The destination types 170 available may include restaurants, energy replenishment stations (e.g., gas or electric charging stations), parks, grocery stores, and other merchants, business, medical, or recreational destinations, or any other type of destination. In keeping with the current example, the user selects a food option 1270 with the finger 601 to choose a place to stop for dinner on the way to returning to the user's lodging by 11:00 p.m.

Figure 13:
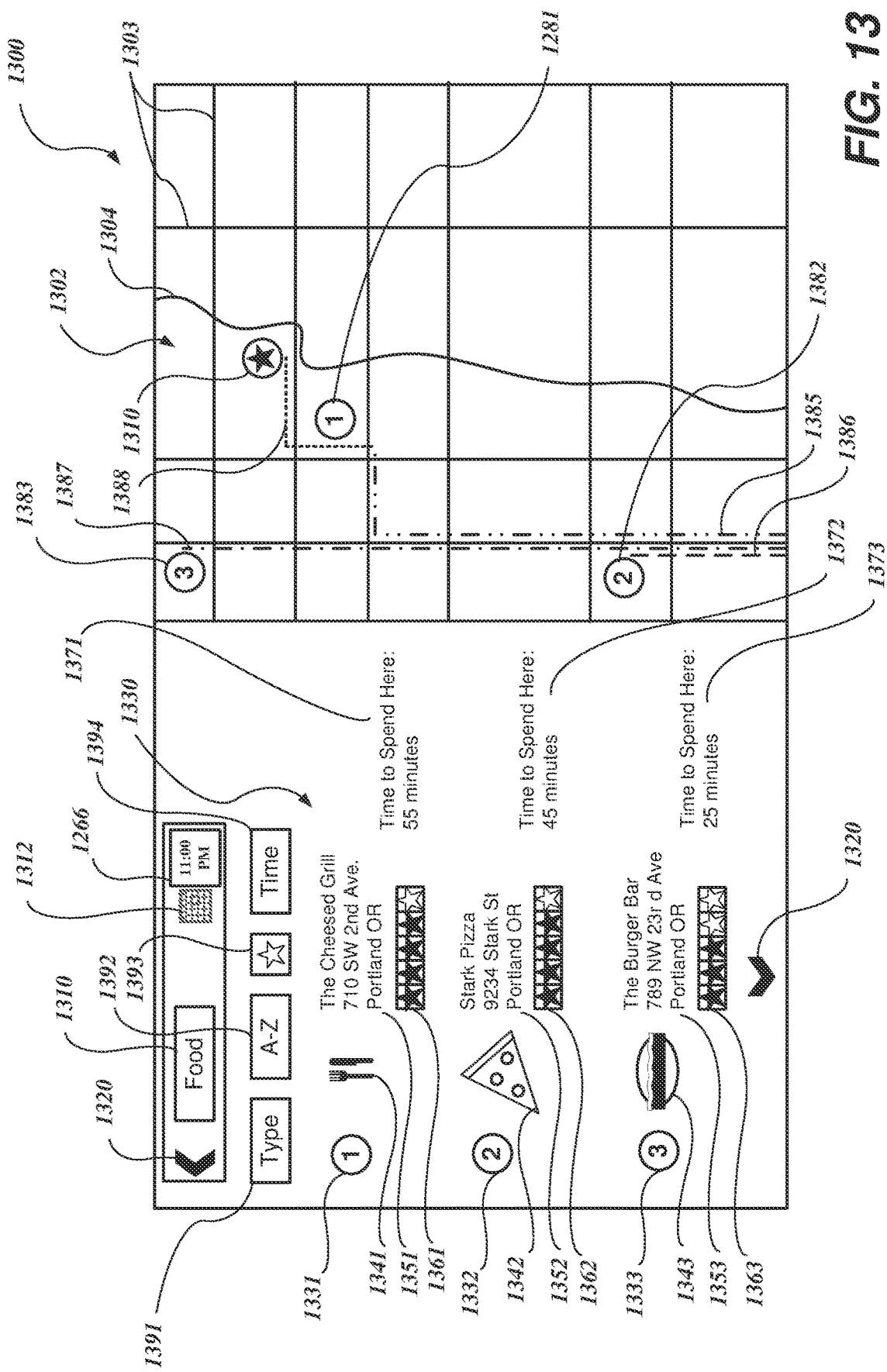

Referring to FIG. 13, in response to selecting the food option 1270 (FIG. 12), the user is presented with an intermediate destination selection screen 1300. The intermediate destination selection screen 1300 includes a listing of restaurants 1330 to enable the user, in keeping with the ongoing example, to get dinner on the way to the user's destination by 11:00 p.m. In presenting the list of restaurants 1330, the intermediate destination screen 1300 has been tailored to the user's selection of the food option 1270 of FIG. 12. If the user had chosen, for example, the restroom option, it will be appreciated that a different destination screen would have been presented to list locations of available restrooms that the user could visit on the way to the destination.

In addition to being tailored to the user's selection of food locations, in various embodiments, the list is tailored according to the desired time (i.e., 11:00 p.m.) by which the user wants to reach the destination. Thus, when a user does not have sufficient time to both travel to a particular food location and travel from the food location to the destination, that food location may not be listed. Moreover, in various embodiments, the system 100 may include a default minimum visit time that a user may spend at a restaurant. Thus, food locations that the user would not be able to travel to, spend the default minimum visit time, and then travel to the destination by the desired arrival time also may not be listed. The default minimum visit time, as further described below, may be set to 30 minutes. However, a longer or shorter default minimum visit time may be set, and the user may be able to alter the default minimum visit time for the present case or as a general default for present and future cases. Similar calculations may be made for other types of intermediate destinations other than food establishments. For example, a shorter default minimum of 15 minutes may be set for a refueling or recharging stop.

Continuing to refer to FIG. 13, in addition to the listing of food locations 1330, the intermediate destination selection screen 1300 also includes a listing indicator 1310 to remind the user that this is a list of food locations. A scheduling mode reminder 1312 may be presented to indicate that the user is selecting an intermediate destination prior to the user's selected destination arrival time 1266 of 11:00 p.m. A back or escape icon 1320 enables the user to exit from the intermediate selection screen 1300, such as by using the finger 601 (not shown in FIG. 13) or a voice command. In various embodiments, from the intermediate destination screen 1300, the user also may engage the listing indicator 1310 to change the type of intermediate destination, engage the scheduling mode reminder 1312 to cancel the scheduling mode or change the selected destination arrival time, or perform other functions.

As shown in FIG. 13, the listing of food locations 1330 includes locations 1331-1333 of three restaurants. Each of the locations 1331-1333 include an identifier, such as a number, letter, or other symbol, for correlation purposes, as further described below. The listing of food locations 1330, respectively for each of the locations 1331-1333, includes a name and address 1351-1353 and a food type 1341-1343 which may be presented in iconic form as shown or in a textual form. The listing of food locations also includes a rating 1361-1363 that may be drawn from past user entries or a ratings service. In addition, considering an expected travel time to the destination by way of any of the locations 1331-1333, an available time 1371-1373 (i.e., "Time to Spend Here") is associated with each of the locations 1331-1333, respectively. The available time 1371-1373 is determined based on travel time to each of the locations 1331-1333 and the time to travel from each of the locations 1331-1333 to the destination to be reached by the selected destination arrival time.

For example, with the selected destination arrival time 1266 of 11:00 p.m., if the current time is 9:45 p.m., there is a period of 75 minutes before the user should arrive at the destination. Thus, if the location 1331 is 5 minutes from the user's point of origin (e.g., the user's present location), and the travel time from the location 1331 to the destination is 15 minutes, deducting travel time to the location 1331 and then from the location 1331 to the destination leaves 55 minutes. Thus, the available time 1371 at the location 1331 is 55 minutes. The available time 1372 and 1373 for the other locations 1332 and 1333, respectively, may be calculated in the same way. As a result, without mental calculation, the user can make a plan in consideration of one or more of the food type 1341-1343, the rating 1361-1363, the available time 1371-1373, or other presented information. Thus, if the user wants pizza and 45 minutes is determined by the user as sufficient time to order and eat the pizza, the user may choose location 1332 or the user may make another choice. Additional choices of locations that may be available may be accessed by using a scroll input 1320 with the finger (not shown) or with voice commands.

In various embodiments, the listing of food locations 1330 is sortable according to user preferences. For example, the listing of food locations 1330 may be sortable by selection of a sort type including a food type 1391, an alphabetical listing 1392, a rating 1393, or an available time 1394. Thus, the user may be able to sort the list by what the user feels like eating, whether the user wants a quick bite or leisurely meal, etc. As a default or by user selection, the listing of food locations 1330 is sorted in descending order by available time 1371-1373.

In various embodiments, the intermediate destination selection screen 1300 also may include a map 1302 of an area including the locations 1331-1333 and the destination 1310. The locations 1331-1333 are signified on the map 1302 by symbols 1381-1383, respectively, that correlate with the identifiers used in the listing 1330 of the locations 1331-1333, respectively. The map 1302 may include streets 1303 and/or highways 1304 in the area. For the user's information, the map 1302 also may include routes 1385-1387 to each of the locations 1331-1333. The map 1302 also may include a subsequent route 1388 to the destination 1310. In FIG. 13, only the subsequent route 1388 from the location 1331 to the destination 1310 is shown in FIG. 13. However, in various embodiments, the map 1302 may also show routes from the other locations 1332 and 1333 to the destination 1310. The information provided by the map 1302 also may be useful to the user in making a dining plan in the event the user wants to drive a certain route to see a landmark, avoid potential traffic, or for other considerations.

In various embodiments, the system 100 also may consider the travel capacity of a vehicle in which the user is travelling. For example, if the user's vehicle is low on fuel or battery charge, the user may have to stop on the way to the destination to replenish the vehicle's available energy. The determination may be based on an actual amount of energy needed to reach the destination, on an amount of energy needed to reach the destination while leaving a threshold amount of energy for travel upon leaving the destination, or other considerations.

Figure 14:
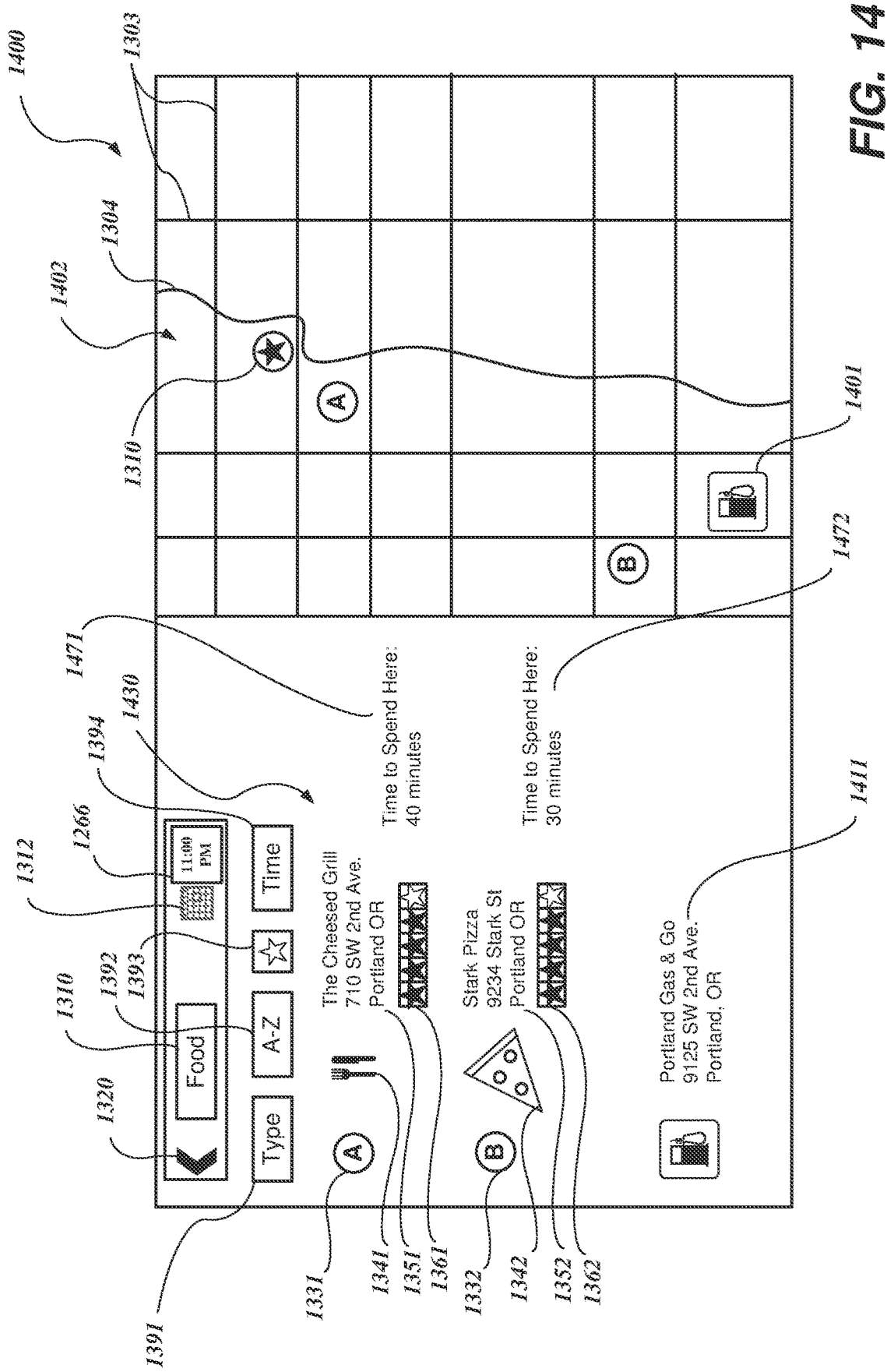

Referring to FIG. 14, for example, when the user selects the food option 1270 in selecting an intermediate destination (FIG. 12), the system 100 determines that any deviation from traveling directly to the destination will require additional energy. An intermediate destination selection screen 1400 shows the consequences of the deviation for fuel. Accordingly, the system 100 determines what locations may be available for the food option by considering, in addition to travel time to each of the locations 1331 and 1332 and the time to travel from each of locations 1331 and 1332 to the destination, the time to travel to a station to replenish the vehicle's energy and a time to replenish the vehicle's energy supply.

For a gas-powered vehicle, for example, a refueling time may be estimated at 10 minutes; for an electric vehicle, a longer time to reach a particular level of charge may different. For purposes of the example, the system 100 determines that it will take 10 minutes to replenish the vehicle's energy. Also, by identifying a station 1401 that is not out of the way on the routes to the locations 1331 and 1332, only 5 additional minutes are attributed for traveling to the station. Thus, in addition to travel times to the locations and subsequent travel times from the locations to the destination, an additional 15 minutes is deducted from the available times at each of the locations. Thus, the available time 1471 for location 1331 is 40 minutes (instead of 55 minutes for the available time 1371 of FIG. 13). Similarly, the available time 1472 for location 1332 is 30 minutes (instead of 45 minutes for the available time 1372 of FIG. 13).

In various embodiments, deducting the additional time for replenishing the energy of the vehicle may leave an available time at some of the intermediate destinations below a default threshold time. Accordingly, some locations, such as location 1333 (included in FIG. 13, but not in FIG. 14) may be eliminated from the list of potential intermediate destinations.

It will be appreciated that a map 1402 of the intermediate destination selection screen 1400 includes a station 1401 where the user may replenish energy of the vehicle. Information 1411 for the station 1401 is also included on the intermediate destination selection screen 1400. It will be appreciated that, just as a list of alternative food locations is offered, a list of alternative stations to replenish energy of the vehicle may be provided from which the user can choose. The routes, travel times, available times, etc., may be calculated as a result of the user's choice of station.

Figure 15:
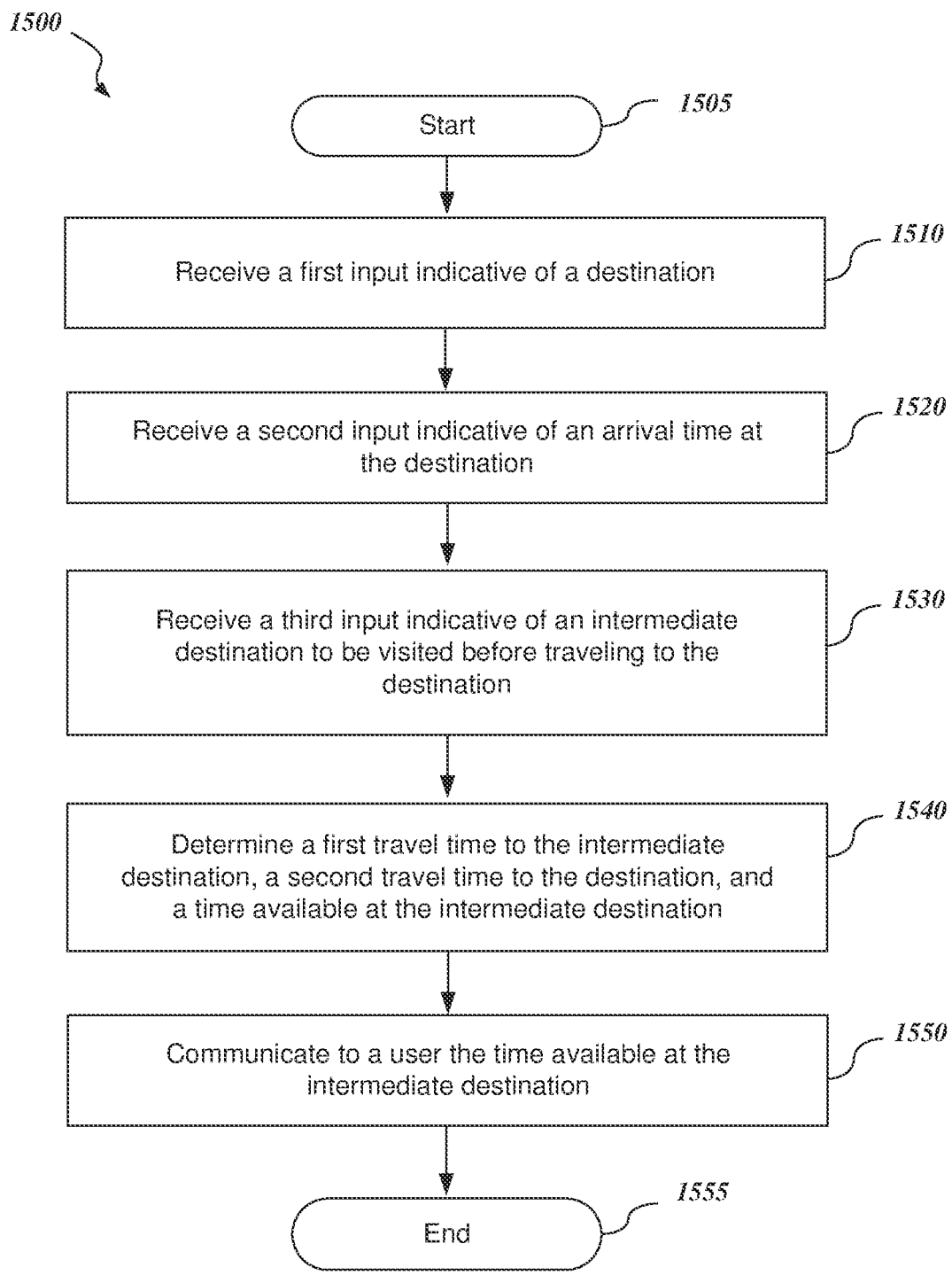
FIG. 15 is a flow chart of an illustrative method for receiving inputs indicative of a destination and a potential intermediate destination and determining a time potentially available at the intermediate destination.

Referring to FIG. 15, an illustrative method 1500 is provided for receiving inputs indicative of a destination and a potential intermediate destination and determining a time potentially available at the intermediate destination. The method 1500 starts at a block 1505. At a block 1510, a first input indicative of a destination is received. At a block 1520, a second input indicative of an arrival time at the destination is received. It will be appreciated that the inputs of blocks 1510 and 1520 are receivable in the order shown, or the arrival time may be presented as the first input and the destination is receivable as a second input.

At a block 1530, a third input indicative of an intermediate destination to be visited before traveling to the destination is received. At a block 1540, a first travel time to the intermediate destination, a second travel time to the destination, and a time available at the intermediate destination are determined. At a block 1550, the time available at the intermediate destination is communicated to a user. The method ends at a block 1555.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
   an input interface disposed in a vehicle;
   a display module disposed in the vehicle; and
   a computing device having a non-transitory computer-readable medium storing computer-executable instructions configured to cause the computing device to:
   identify, based on input received by the input interface, a destination and a desired arrival time at the destination;
   identify, based on input received by the input interface, an intermediate destination to be visited before traveling to the destination;
   compute a first travel time to the intermediate destination and a second travel time from the intermediate destination to the destination;
   determine a time available at the intermediate destination based on the desired arrival time, the first travel time to the intermediate destination, and the second travel time from the intermediate destination to the destination; and
   provide, via the display module, a display of the determined time available at the intermediate destination.

2. The system of claim 1, wherein the computing device is further configured to:
   determine a first route to the intermediate destination and a second route from the intermediate destination to the destination; and
   display on the display module the determined first route and the second route.

3. The system of claim 1, wherein:
   the intermediate destination comprises a location chosen from a specific intermediate destination and a type of intermediate destination; and
   the computing device is further configured to identify at least one possible intermediate destination of the type of intermediate destination.

4. The system of claim 3, wherein the computing device is further configured to eliminate potential intermediate destinations responsive to determining that the first travel time and the second travel time result in the time available at the intermediate destination being less than an associated time for the type of intermediate destination.

5. The system of claim 3, wherein the computing device is further configured to:
   display on the display module a list including the at least one possible intermediate destination; and
   display on the display module an associated available time at the at least one possible intermediate destination.

6. The system of claim 5, wherein the list further includes at least one attribute regarding the at least one possible intermediate destination chosen from a description of the at least one possible intermediate destination and a quality rating associated with the at least one possible intermediate destination.

7. The system of claim 1, wherein the computing device is further configured to:
   determine if the vehicle has an energy capacity to reach the intermediate destination and the destination; and
   responsive to determining that the vehicle does not have the energy capacity to reach the intermediate destination and the destination, identify at least one station where the energy capacity of the vehicle may be replenished.

8. The system of claim 7, wherein the computing device is further configured to display on the display module a report chosen from a report of reduced time available at the intermediate destination responsive to allocating additional travel time to the at least one station and replenishment time and a report of a lack of time available at the intermediate destination responsive to determining that allocating additional travel time to the at least one station precludes reaching the destination by the desired arrival time.

9. A vehicle comprising:
a cabin configured to receive at least one occupant;
a drive system configured to motivate, accelerate, stop, decelerate, and steer the vehicle;
an input interface disposed in the cabin;
a display module disposed in the cabin; and
a computing device having a non-transitory computer-readable medium storing computer-executable instructions configured to cause the computing device to:
identify, based on input received by the input interface, a destination and a desired arrival time at the destination;
identify, based on input received by the input interface, an intermediate destination to be visited before traveling to the destination;
compute a first travel time to the intermediate destination and a second travel time from the intermediate destination to the destination;
determine a time available at the intermediate destination based on the desired arrival time, the first travel time to the intermediate destination, and the second travel time from the intermediate destination to the destination; and
provide, via the display module, a display of the determined time available at the intermediate destination.

10. The vehicle of claim 9, wherein the computing device is further configured to:
determine a first route to the intermediate destination and a second route from the intermediate destination to the destination; and
display on the display module the determined first route and the second route.

11. The vehicle of claim 9, wherein:
the intermediate destination comprises a location chosen from a specific intermediate destination and a type of intermediate destination; and
the computing device is further configured to identify at least one possible intermediate destination of the type of intermediate destination.

12. The vehicle of claim 11, wherein the computing device is further configured to eliminate potential intermediate destinations responsive to determining that the first travel time and the second travel time result in the time available at the intermediate destination being less than an associated time for the type of intermediate destination.

13. The vehicle of claim 11, wherein the computing device is further configured to:
display on the display module a list including the at least one possible intermediate destination; and
display on the display module an associated available time at the at least one possible intermediate destination.

14. The vehicle of claim 13, wherein the list further includes at least one attribute regarding the at least one possible intermediate destination chosen from a description of the at least one possible intermediate destination and a quality rating associated with the at least one possible intermediate destination.

15. The vehicle of claim 9, wherein the computing device is further configured to:
determine if the vehicle has an energy capacity to reach the intermediate destination and the destination; and
responsive to determining that the vehicle does not have the energy capacity to reach the intermediate destination and the destination, identify at least one station where the energy capacity of the vehicle may be replenished.

16. The vehicle of claim 15, wherein the computing device is further configured to display on the display module a report chosen from a report of reduced time available at the intermediate destination responsive to allocating additional travel time to the at least one station and replenishment time and a report of a lack of time available at the intermediate destination responsive to determining that allocating additional travel time to the at least one station precludes reaching the destination by the desired arrival time.

17. A non-transitory computer-readable medium comprising instructions stored in a memory and executed by a computing device to carry out steps comprising:
determining, based on input received by an input interface disposed in a vehicle, a first travel time from a starting location to an intermediate destination, a second travel time from the intermediate destination to a destination, and a time available at the intermediate destination based on the first travel time from the starting location to the intermediate destination, the second travel time from the intermediate destination to the destination, and a desired arrival time at the destination; and
displaying on a display module disposed in the vehicle the determined time available at the intermediate destination.

18. The non-transitory computer-readable medium of claim 17, wherein:
the intermediate destination comprises a location chosen from a specific intermediate destination and a type of intermediate destination; and
the computing device is further configured to identify at least one possible intermediate destination of the type of intermediate destination.

19. The non-transitory computer-readable medium of claim 18, the steps further comprising eliminating potential intermediate destinations responsive to determining that the first travel time and the second travel time result in the time available at the intermediate destination being less than an associated time for the type of intermediate destination.

20. The non-transitory computer-readable medium of claim 18, the steps further comprising:
determining if the vehicle has an energy capacity to reach the intermediate destination and the destination; and
responsive to determining that the vehicle does not have the energy capacity to reach the intermediate destination and the destination, identifying at least one station where the energy capacity of the vehicle may be replenished.

* * * * *